United States Patent [19]

Tetirick

[11] 4,351,320

[45] Sep. 28, 1982

[54] SOLAR ENERGY HEATING PANEL FOR A BUILDING

[76] Inventor: Jack E. Tetirick, 105 Indian Springs Dr., Columbus, Ohio 43214

[21] Appl. No.: 93,411

[22] Filed: Nov. 13, 1979

[51] Int. Cl.³ .............................................. F24J 3/02
[52] U.S. Cl. ................................ 126/425; 126/429; 126/432; 126/DIG. 1; 126/441; 126/449
[58] Field of Search ............... 126/424, 425, 429, 431, 126/432, 438, 439, 449, 441

[56] References Cited

U.S. PATENT DOCUMENTS

| | | | |
|---|---|---|---|
| 4,000,734 | 1/1977 | Matlock et al. | 126/425 |
| 4,002,159 | 1/1977 | Angilletta | 126/429 |
| 4,084,575 | 4/1978 | Nicewonger | 126/432 |
| 4,088,117 | 5/1978 | Keyes | 126/438 |
| 4,149,522 | 4/1979 | Keeling | 126/441 |
| 4,237,865 | 12/1980 | Lorenz | 126/439 |
| 4,262,657 | 4/1981 | McCullough et al. | 126/441 |

FOREIGN PATENT DOCUMENTS 2609638 9/1977 Fed. Rep. of Germany ...... 126/432

*Primary Examiner*—Carroll B. Dority, Jr.
*Attorney, Agent, or Firm*—Robert E. Stebens

[57] ABSTRACT

A solar energy heating panel is provided for mounting in a building wall to effect heating of the air in an interior building space. A plurality of the heating panels are mounted in parallel relationship in a supporting structure for angular rotation about horizontal pivot axes to selected position. Each of the heating panels includes a heat-transfer controlling panel and a cellular unit mounted on one surface of the controlling panel, the opposite surface of the controlling panel being reflective of solar radiation. The cellular units are formed with mutually intersecting, longitudinally and transversely extending walls disposed in upstanding relationship to the controlling panel surface and which define a plurality of individual cells that are open at an end remote to the controlling panel surface. The longitudinally extending walls are disposed parallel to the axes of rotation and have a plurality of apertures formed therein to permit airflow transversely through each cell. All wall surfaces of each cell, except one longitudinal wall surface, are coated with a material to enhance absorption of solar radiation, the longitudinally and transversely extending walls being formed from a metal having a relatively high coefficient of thermal conductivity.

18 Claims, 6 Drawing Figures

SOLAR ENERGY HEATING PANEL FOR A BUILDING

BACKGROUND OF THE INVENTION

This invention is directed to the providing of a solar energy heating panel for incorporation in a side wall of a building to be utilized in the providing or preserving of heat in a structure such as a residential home. This solar panel does not form the side wall itself, but is incorporated in portions of an exterior wall and functions to either extract solar radiation heat by transfer to air that can flow through the panel structure to other areas of the housing structure or to prevent this transfer of solar radiation heat.

Several types of solar wall systems are known for use in conjunction with windows, wall units, or building panels as a means for utilizing solar radiation in heating a structure. Some of these systems utilize louvered plates to assist in transfer of the heat. Angilletta, U.S. Pat. No. 4,002,159, discloses a venetian blind for solar heating. The arcuately shaped blind slats have one side coated with a radiation absorptive substance and the other side coated with a radiation reflective material. Ambient air from a room passes between the several slats of the blind and is heated, depending on the positioning of the slats of the blind, and returned to the room through openings at an upper end of the blind structure.

Louvered plates are also utilized in Bourne, U.S. Pat. No. 3,971,359. Bourne discloses a flat plate solar air heater which permits low angle solar radiation to enter a black-surfaced absorbing chamber. The top and bottom of the chamber are adapted to having air conveying duct work interconnected thereto to enable transfer of air from a room through the heater. Similarly, Pedersen, U.S. Pat. No. 4,014,313, discloses a flat plate solar air heater in which the plates may be oriented at various angles to more efficiently receive radiant energy. These plates also have a surface coating to aid in absorption of energy.

The solar heating panels as exemplified by these three patents are representative of the known structures of this type which essentially comprise a plurality of surfaces over which the air must flow in effecting a heat transfer. Additionally, it is known to coat the surfaces of the louvered plates to enhance their heat absorption capability and to mount the plates or slats on pivots to enable selective positioning for control of their functioning.

While louvered plate systems are known, those systems disclosed in the noted patents all possess limitations. First, and most importantly, is the degree of heating efficiency associated with the utilization of plates to absorb the energy. A single plate has a limited amount of energy which it can store and a limited surface area for either absorption of radiation or transfer of heat to the air flowing over the plate. Even though Angilletta attempts to increase efficiency by making the plates arcuately shaped instead of flat, the degree of increased efficiency associated with such an improvement is not substantial. Not only would a louvered system having a greater surface area be capable of absorbing more energy, but it would also be capable of transferring more energy in an efficient manner to air that is caused to flow over that surface by either convection currents or forced circulation.

SUMMARY OF THE INVENTION

In accordance with this invention, a solar energy heating panel for a side wall of a building structure to be utilized in the preserving or providing of heat for a structure, such as a residential home, is provided for advantageous use when installed in a side wall or building panels. The structure of this invention is formed from rectangular cellular units made preferably of metal having a suitable heat absorption and transfer characteristics that are mounted on a thermal insulation panel. Each of the cellular units has four surfaces, two of which have apertures through them and are disposed in opposed relationship and two other opposed surfaces which are solid. The one end of each cell is entirely open and the other end of the cell lies adjacent to the thermal insulation panel on which it is mounted and which effectively seals that end of the cell. In accordance with this invention, a plurality of the cellular units are formed in series adjacent relationship to one another such that one cell's apertured wall is adjacent to another cell's apertured wall and that all of the solid walls are juxtaposed to one another. Similarly, each of the cells is attached to the surface of the thermal panel which results in a honeycomb effect when looking at the one side of the panel to which the cells are fastened. In operation, the panel is mounted with the cells oriented so that the apertured walls extend horizontally and the solid walls extend vertically.

Of the four metallic interior surfaces in each cellular unit, the two solid sides and the apertured ceiling wall are coated with a substance (black paint) that enhances their energy absorbing capability. The lower apertured surface is coated with a material to enhance its radiation reflective capability. The thermal insulation panel is comprised of conventional thermal insulation material and structural elements so as to be structurally self-supporting. The face of the panel which is visible as forming an end wall for the cells is also coated with an energy absorbing substance. The opposite surface of the panel is coated with a material that is highly reflective to solar radiation. Each end of the panel is mounted on a pivot which provides for relative rotation of the panel about a horizontal axis. The exposed exterior surfaces of the attached cellular units form a contiguous surface which is also preferably coated with an energy absorbing substance.

This invention is positioned within a side wall or building panel having a transparent outer surface, such as glass, and an inner housing wall. A plurality of such cellular panels are provided in vertically stacked relationship with each panel having a limited vertical dimension to enable pivoting to a desired angular position. The orientation of the units is such that all of the apertured wall surfaces extend horizontally to the ground on which the side wall rests. The several panels can be pivoted to provide control of the effectivity of the apparatus. The several panels are selectively revolved to any one of three generally defined positions in their use. First, the panels may be revolved to the position in which the reflective surfaces of the thermal panels lie parallel to each other and face towards the outer glass side wall, thus effectively preventing incident solar radiation from having any heating effect. Secondly, the panels may be revolved to the position in which the reflective surfaces of the thermal panels lie parallel to and face towards the inner housing wall, thereby placing the cells in a position to absorb solar radiation. To enhance operation and effect further control, the panels may be revolved to a selected angularly oriented position in which the reflective surfaces of the thermal panels lie parallel to one another, but are not parallel to either side wall, thus placing the cells in a third position for effecting a desired or optimum absorption of solar radiation.

The primary objective of this invention is to provide a solar heating panel that is of extremely economical construction for use in a side wall, and that is capable of capturing more radiant energy than other known systems, and that is adjustable to control the effectivity of the apparatus.

Another objective of this invention is to provide a solar heating panel which enables efficient heat flow by convection.

Still another objective of this invention is to provide a solar heating panel which is also controllable so as to be capable of retaining heat within a structure by preventing heat loss.

These important objectives are furthered by the incorporation of the solar heating panel of this invention in the side wall or building panel having a transparent glass panel and a housing structural wall along with any desired duct work and fans that may be desired to effect particular heating functions.

These and other objects and advantages of this invention will be readily apparent from the following detailed description of an illustrative embodiment thereof. Reference will be had to the accompanying drawings which illustrate an embodiment of the invention.

DESCRIPTION OF THE DRAWING FIGURES

DESCRIPTION OF THE ILLUSTRATIVE EMBODIMENT

Figure 1:
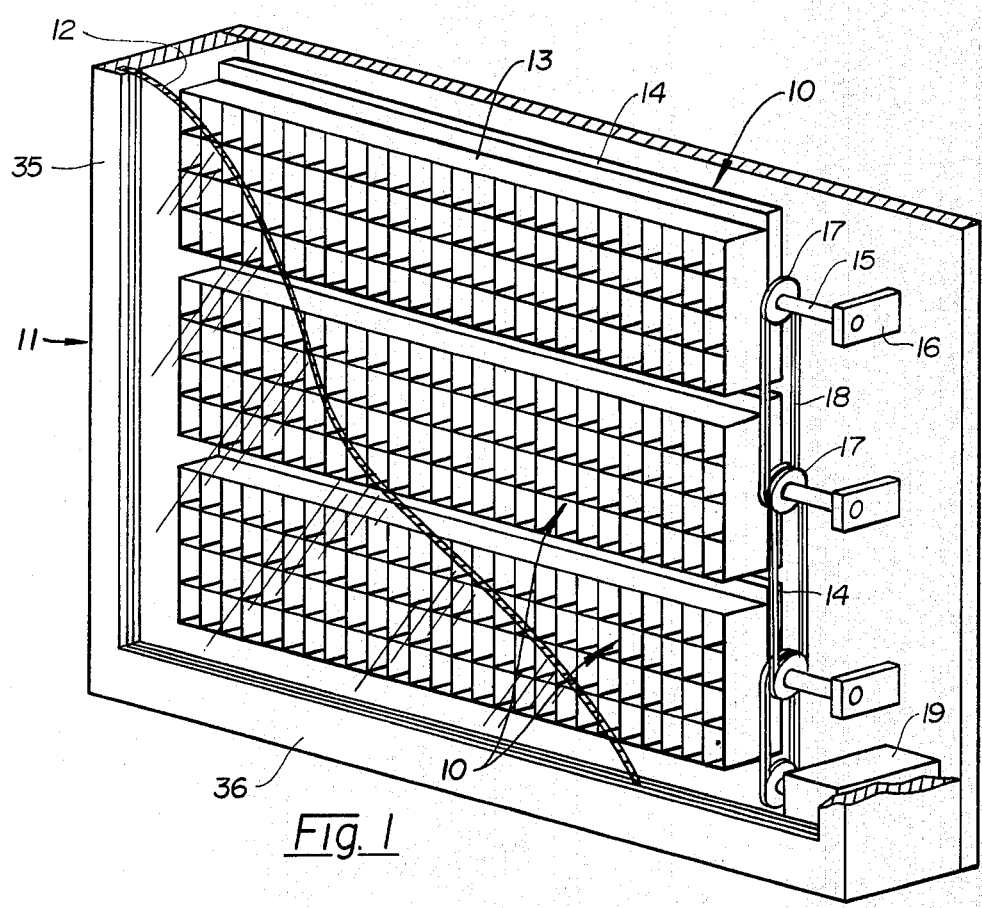
FIG. 1 is a perspective view of a plurality of horizontally extending, solar energy heater panels embodying this invention and shown positioned in a structural building wall.

Having reference to the drawings, attention is directed first to FIG. 1, which illustrates a series of elongated, solar energy heating panels embodying this invention and designated generally by the numeral 10. FIG. 1 discloses three sets of the panels 10 positioned in vertical series relationship in a structural building wall 11 provided with a solar radiation transmitting glass panel 12. The solar panels 10 include as basic components thereof a cellular unit 13 and a thermal insulation panel 14. The thermal insulation panel 14 may be composed of any suitable thermal insulation. The cellular units 13 are composed of a heat conductive metal, preferably aluminum, which is capable of effecting a rapid transfer of heat. The choice of metal is also important since the metal must be light enough in weight to allow the cellular unit 13 to be fastened to the insulation panel 14. The cellular units 13 project laterally from one surface of the panel 14 to which they are secured in vertically extending columns and horizontally extending rows in a resultant honeycomb configuration.

Projecting laterally from the middle of the end wall of each panel 10 is a pivot pin or trunnion 15. The pivot pins 15 are journalled in a suitable bearings 16 that are mounted on the building wall 11. Mechanical interconnection of the several panels by sprockets 17 and chains 18 enables all panels to be revolved in unison to a selected angular position. Also, a motorized drive and control unit 19 is preferably provided and coupled in driving relationship with the chains 18 to facilitate angular positioning of the several panels 10. If desired, this control unit may be provided with automatic control features responding to various environmental parameters for optimum positioning of the panels for either heating or cooling functions.

Each of the sets of cellular units 13 for a particular panel 10 are mechanically attached to the respective thermal insulation panel 14 which provides the necessary structural support. These thermal insulation panels are of a composite construction as can be best seen in FIGS. 2 and 3 and include a structurally rigid plate 20 that is secured to a thermal insulation board 21 and is coextensive with the one surface of the board. Suitable adhesives may be utilized to secure the plate and board in mechanically fixed relationship. This plate 20 is preferably formed from a metal which has a desired degree of thermal conductivity to enhance the unit's ability to absorb solar radiation or to re-radiate heat energy or to otherwise effect transfer of heat to the air that flows over or in association with the panel. Also, a metal plate provides a convenient structural base for mounting of the pivot pins or trunnions 15. The thermal insulation board 21 is formed from materials possessing the necessarily low thermal conductivity characteristics so that heat transfer with respect to the plate 20 will be minimized as to the surface that is adjacent to the thermal panel. A solar radiation reflective sheathing 22 is secured to the opposite face of the thermal insulation board 21. This solar reflecting sheathing 22 may also extend over the longitudinal and end edges of the insulation board 21 to provide a complete covering for the board; but, preferably, there will not be any direct connection between the sheathing 22 and the plate 20 to effectively eliminate any direct thermal conductive path, thereby minimizing the likelihood of heat transfer from one side to the other of the panel 14.

Figure 2:
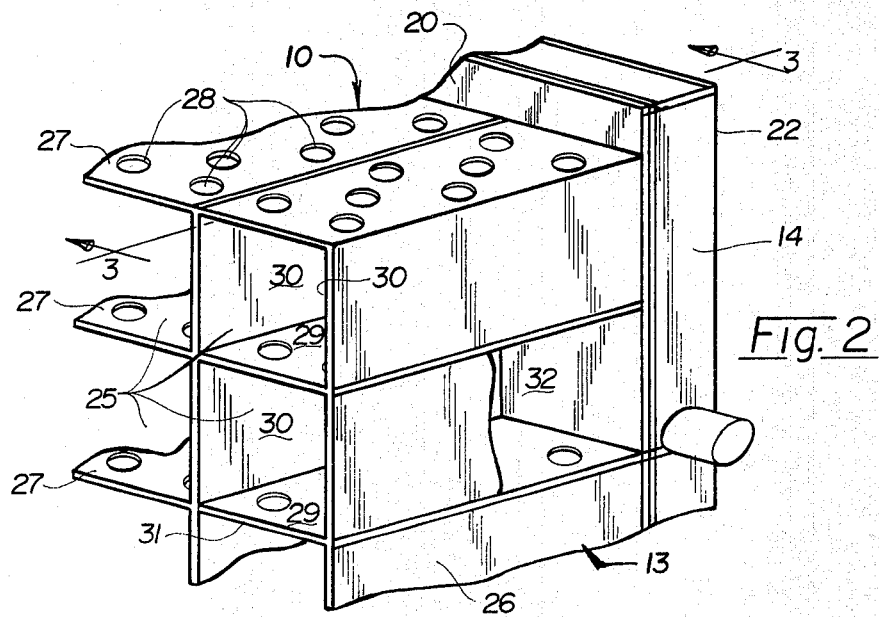
FIG. 2 is an enlarged perspective view of a portion of a corner of one of the elongated panel sections shown in FIG. 1.
Figure 3:
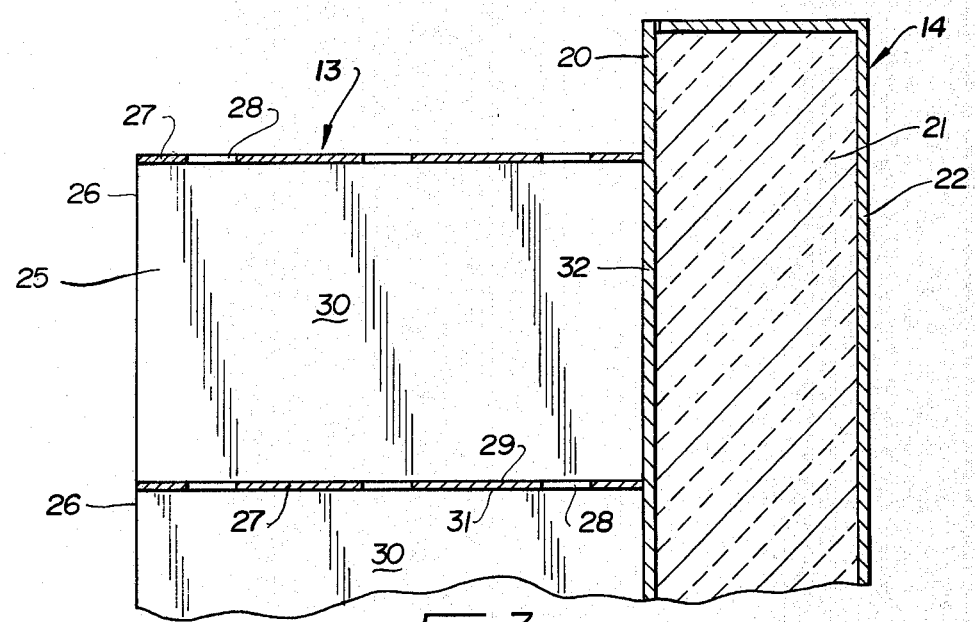
FIG. 3 is a vertical sectional view on an enlarged scale taken along line 3—3 of FIG. 2.

An enlarged view of a cellular unit 13 is also provided in FIGS. 2 and 3. Each cellular unit 13 is formed from a metal material having a relatively high thermal conductivity characteristic, such as relatively thin sheet steel or aluminum. The sheet metal is fabricated into a number of rectangular cross section cells 25 of predetermined length with the composite cell structure mounted on the rigid plate 20 of the thermal insulation panel 14 whereby the one end of each cell is closed by that plate. Mounting of the cellular unit 13 is preferably accomplished by means and techniques to form a good thermally conductive path as between the cellular unit and the insulation panel plate 20. This can be accomplished by suitable welding techniques. The individual cells 25 are arranged in longitudinally or horizontally extending rows and transversely oriented columns which are vertically oriented when the panels 10 are positioned as shown in FIG. 1. Referencing this portion of the description to the vertical disposition of the panels, as shown in FIGS. 1, 2 and 3, it will be seen that the vertical side walls 26 of each cell are closed walls whereas the horizontal walls 27 are formed with a plurality of apertures 28. These apertures 28, as will be further explained, permit convective air currents to flow vertically through each series of vertically aligned cells 25 and thus effect heating of the air through absorption of heat that is transferred from the cell walls 26, 27 and the insulation panel plate 20.

In general, functional operation of the panel 10 has the panel oriented with the open end of the cells generally directed along the path of incident solar radiation so as to cause that radiation to be incident to the upper surface 29 of each horizontal wall 27 of the cellular unit. That radiation incident to the surface 29 is partially absorbed by the wall, but is also reflected so as to be incident to either of the inwardly facing surfaces 30 of the vertical walls 26 and the bottom surface 31 of the upper horizontal wall 27. Additionally, some of the reflected radiation will be incident to surface 32 of the insulation panel plate 20 which forms the bottom of the cell. Thus, incident solar radiation will be absorbed by each of the several walls forming each cell and generate heat that can subsequently be transferred to the air that flows through the cellular unit.

To enhance functional operation of the panel 10, the upper surface 29 of each horizontal wall 27, except that of the uppermost row of cells 25, is coated with a material (such as white paint) to improve its solar radiation reflectivity, whereas the other interior surfaces 30, 31 and 32 are coated with a material (such as black paint) to imprive their ability to absorb solar radiation. The upper surface of the uppermost horizontal wall and the bottom surface of the lowermost horizontal wall are preferably coated with a radiation absorptive material. Suitable commercially available paints are available to form the respective diverse function coatings. Dimensionally, an exemplary panel 10 may have cells which are of the order of five (5) centimeters in depth and a cross-sectional dimension of the order of two and one-half (2.5) centimeters. These dimensions have been determined to be of a preferred proportional relationship to achieve the required radiation reflection and absorption and have an adequate surface area to effect a subsequent transfer of heat to the air flowing through the cells. To further enhance the ability of the cellular unit to transfer heat to the air, the apertures 28 may be arranged in relatively misaligned relationship as between adjacent pairs of horizontal walls to increase turbulence in the air flow and thereby enhance air flow closely adjacent to the various surfaces of each cell 25 to improve heat transfer.

Having reference to the several drawing figures, it will be noted that each of the thermal insulation panels 14 is of a greater transverse dimension than the respective cellular unit 13, although they are essentially equal in longitudinal length. Also, the cellular unit 13 is positioned on its respective insulation panel 14 so that the excess transverse width appears at only one longitudinal side. The objective of this structural configuration is to permit mounting of the panels 10 in closely adjacent vertical relationship with minimum spacing between adjacent edges of any two panels. This arrangement is required because of the depth of the cells which would otherwise require a substantial spacing to permit revolution of the panels and result in an undesirable gap through which solar radiation would otherwise freely pass.

Figure 4:
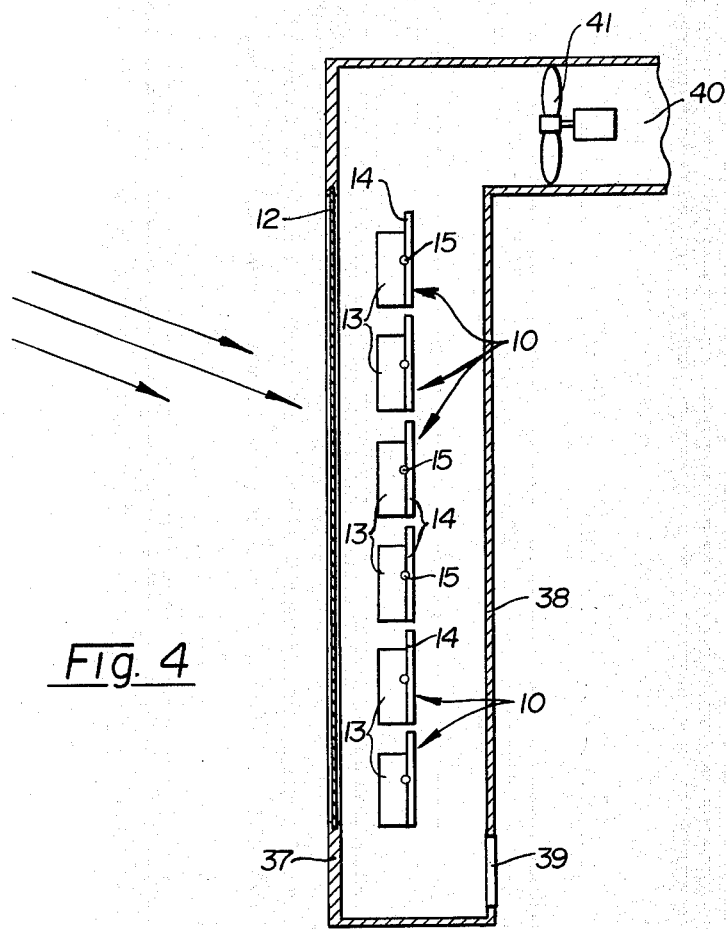
FIG. 4 is a vertical sectional view of the several panels positioned in a wall unit for absorbing radiant energy.

FIG. 4 diagrammatically illustrates several of the solar panels 10 mounted within a structural building wall 11 which may be a part of the vertical side wall of a building. A building wall of a conventional wood frame structure includes transversely spaced vertical members 35 and upper and lower horizontal members 36 which can be utilized as the structural frame for support and mounting of the solar panels or, if desired, a separate and independent structural frame may be provided. The glass panel 12 is secured in the wall members 35 and 36 by a frame 37 that supports the glass at the outer or exterior side of the wall and, in cooperation with an interior wall 38, defines a central space in which the several solar panels 10 are mounted in vertically aligned relationship and through which the air to be heated is circulated. An air inlet 39 is formed in the interior wall 38 at a point which is below the lowermost solar panel 10 in order that air which flows into the wall space will flow upwardly with reference to all solar panels. A discharge duct 40 may be provided at the upper end of the wall to route heated air to a relatively remote location within the building. Also, an electric motor driven fan 41 may be positioned in the duct 40 to assure a positive air flow if convection induced air currents are not deemed adequate in a particular installation with those convective air currents resulting from heating produced by the solar cells 10. Air within the individual cells 25 is heated by transfer of heat from the cell walls and that heated air will rise, flowing through and around the cells and thereby induce convective currents that draw air in at the bottom and discharge it at the top.

In FIG. 4 solar radiation from the sun S is shown as being directed towards the glass plate 12. This solar radiation passes through the glass plate 12 and strikes the solar panels 10 and, in particular, the radiation strikes the cellular units 13. The panels 10 are shown oriented so that the radiation will be angularly incident and enter through the open ends of the individual cells 25 where it will be either absorbed or reflected at the bottom wall surface 29. Radiation is primarily absorbed by the other walls of the cellular unit 13 as the greatest part of the radiation will be reflected from the radiation reflective upper surface 29 of the horizontal walls 27 in a direction that is up and towards the back of each cell 25 and also to one of the side walls 26 depending on the sun's position relative to the panel. The black coated energy absorbing walls 26 and 27, and the insulation panel plate 20 which is also coated black, therefore absorb most of the solar energy which passes into the cellular unit 13. The black energy absorbing surfaces absorb substantial amounts of both direct and reflected energy in this orientation. Some additional amounts of energy are absorbed by the black energy horizontal wall 27 at the uppermost longitudinal side of the several solar panels 10.

The air in the building wall 11 housing the solar panels 10 is heated as the panels absorb radiation and transfer heat energy. The heated air is then transferred through the building wall 11 by convective air circulation with the rising air passing around the panels 11 and through the cellular units 13 by means of the apertures 28 and is further heated as it passes through successive cellular units. A fan 41 may hasten and assist in the circulation in those instances where substantial solar radiation is available for effecting a rapid heat generation. The structure of the thermal insulation panel 14 also is instrumental in aiding the circulation. The panel 14 projects beyond one longitudinal edge of the cellular units 13, as shown clearly in the drawings and this projection assists in channeling the air, in the case of the orientation shown in FIG. 4, directly from one solar panel to the one directly above it. This channeling enhances the flow of air through the building wall 11 into effective heat transfer relationship with the solar panels 10.

Figure 5:
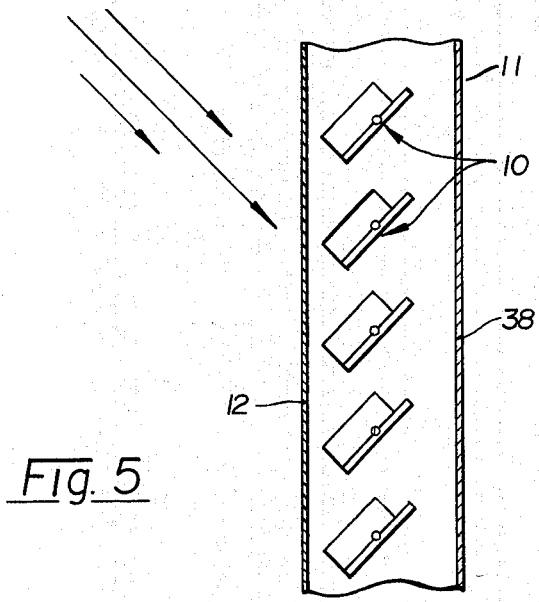
FIG. 5 is a fragmentary vertical sectional view similar to FIG. 4, but showing the cells positioned in an alternative position for absorption of solar radiation.

A more continuous optimum absorption of solar radiation and conversion to useful heat energy can be effected by tilting the solar panels 10 about their horizontal axes to a more optimum angular position such as in accordance with the path of the solar radiation as is illustrated in FIG. 5. This tilting is accomplished by rotating the several solar panels 10 about their respective pivot pins 15 to either an upwardly oriented inclination as shown in FIG. 5 or to a downwardly oriented inclination. Tilted to an optimum position, solar radiation is received at an angle of incidence so that it enters the cellular units 13 for the most advantageous reflection and absorption. Also, as previously noted, control of the angular position of the solar panels 10 may be automatically controlled to maintain the panels at an optimum angle with respect to any particular angle of incidence of the solar radiation. Control apparatus is commercially available to sense the angle of incidence of solar radiation and generate a control signal effecting such automatic control.

Figure 6:
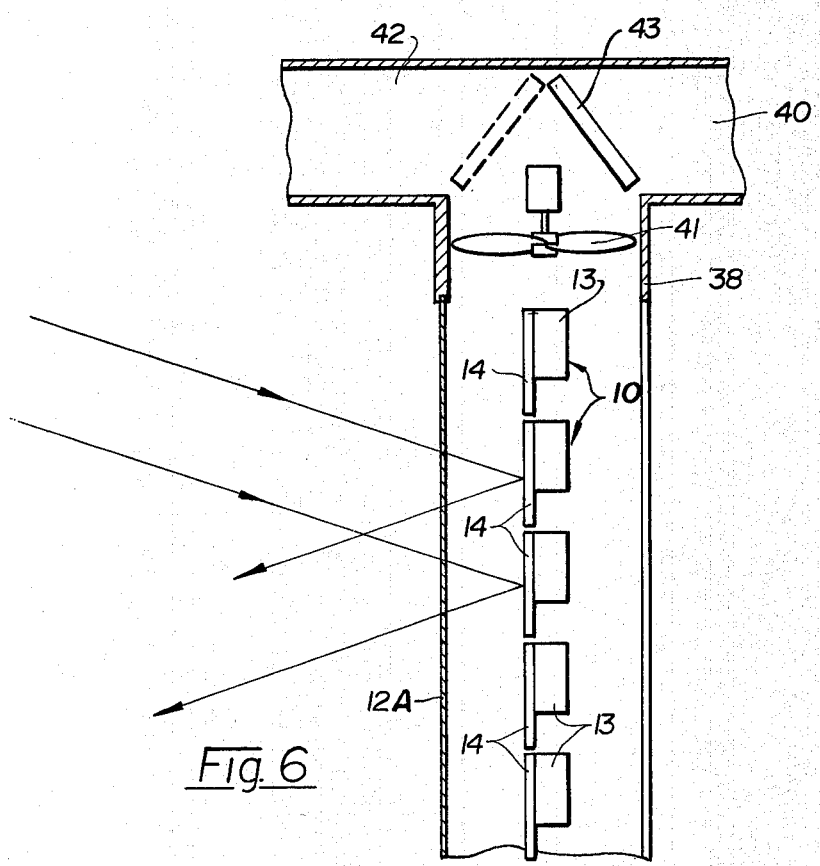
FIG. 6 is a fragmentary vertical sectional view of a modified structure showing the cells positioned in a wall for reflecting solar radiation.

The solar panels 10 of this invention also may be utilized in a cooling mode of operation when rotated on their pivots 15 to the position disclosed in the slightly modified structural building wall 12A shown in FIG. 6. This building wall is substantially the same as that previously described except that it does not include an interior wall, at least in the area of the solar panels 10, and is provided with a discharge duct 42 leading from the upper portion of the wall to the exterior of the building. A controllable valve plate 43 is pivotably mounted centrally between the two discharge ducts 40 and 42 and is selectively positionable in either of the two indicated positions to direct air flow through a selected duct. A fan 41 may be mounted in flow preceding relationship as to each duct so as to be usable regardless of the valve plate's position.

With the solar panels 10 oriented as shown in FIG. 6, now instead of promoting generation of heat in the interior of the building, the solar panels aid in cooling of the building with which it is associated. In this position, the highly reflective solar radiation reflective sheathing 22 faces outwardly toward the glass panel 12. The several solar panels 10 thus form a substantially complete wall surface which is effective in reflecting solar radiation that may be incident thereto and effectively block entrance of such radiation to the interior of the building. The thermal insulation board 21 prevents transmission of heat to the cellular units 13 and there is no direct heat conductive path since the sheathing 22 is not mechanically connected with the plate 20 on the opposite side.

In addition to reflecting solar radiation, thereby effectively preventing generation of heat, the solar panels 10 in this orientation minimize transfer of any heat to the air within the building wall and the air column between the glass panel 12 and solar panels remains as a dead-air space. However, the cellular units 13 which face toward the interior of the building are effective in absorbing radiant energy that may be developed, such as by electric lamps or other heat producing appliances that may be utilized in a residential home. This radiant energy which is absorbed by the cellular units is in turn transferred to the air within the units, thereby increasing its temperature and inducing vertically rising convective air currents. This convective air flow continues upwardly through and along the cellular units ultimately exhausting to the exterior of the building through the discharge duct 42. In some instances, a desired air flow may be induced through operation of the fan 41. As a result of the operation of the cellular units in absorbing radiant energy and producing convective currents, a building which is provided the solar panels 10 of this invention are also capable of assisting in removal of heat from the building's interior.

It will be readily apparent from the foregoing detailed description of illustrative embodiments of this invention that a particularly novel and extremely effective solar panel is provided for use in heating building structures. These solar panels are relatively simple to fabricate and are readily adapted to installation in existing building panels or side walls. The structure, utilizing a honeycomb of metallic cellular units and a thermal insulation panel is economical to fabricate and results in an effective device for solar heating of the air in a building. The specific configuration of the cellular units, providing of coated surfaces for enhanced radiation reflection and absorption of the thermal insulation panel result in a structure that is highly capable of transferring heat obtained from radiant solar energy.

Having thus described this invention, what is claimed is:

1. A solar energy heating unit comprising
   a supporting structure adapted for positioning in a building wall and defining a generally vertically extending chamber for channeling air vertically therethrough, said supporting structure including a front panel and a rear panel of predetermined horizontal and vertical extent spaced a predetermined distance apart and a vertically extending end panel at each side thereof and interconnecting with said front and rear panels, said front panel having a predetermined area thereof formed from a solar radiation transmitting material,
   a plurality of elongated solar energy heating panels positioned within the chamber defined by said supporting structure with each heating panel extending horizontally across the chamber in spaced parallel, vertically stacked relationship to each other heating panel and pivotably mounted on said supporting structure for revolution thereof about parallel axes extending transversely across the chamber, each of said solar energy heating panels being of a width and depth relative to the spacing of the front and rear panels of said supporting structure to permit revolution through at least 180 degrees and including
   (A) an elongated heat-transfer controlling panel having first and second surfaces at opposite respective sides thereof, and
   (B) a cellular unit for absorption and conversion of solar radiation to heat energy mounted on said controlling panel at a first one of said surfaces, said cellular unit including a plurality of relatively spaced apart longitudinal walls and a plurality of relatively spaced apart transverse walls each secured to said controlling panel in upstanding relationship to said first surface thereof, said longitudinal and transverse walls disposed in angularly oriented relationship to each other and cooperatively defining a plurality of cells which are open at an end remote to said controlling panel to permit entrance of solar radiation into incident relationship to interior surfaces thereof, each of said longitudinal walls having a plurality of apertures formed therein to permit airflow transversely through each cell, and selectively operable pivot means cooperatively interengageable with each of said solar energy heating panels for revolving of said heating panels about their respective transverse axes to a selected position.

2. A heating unit according to claim 1 wherein said pivot means includes drive means operatively coupled with each of said heating panels to effect revolution thereof about its pivot axes, said drive means including control means responsive to the angle of incidence of solar radiation to the supporting structure to effect positioning of said panels in a predetermined angular orientation to the path of solar radiation incident thereto.

3. A heating unit according to claim 1 wherein each of said heat-transfer controlling panels is of a greater width dimension than the cellular unit and having longitudinally extending edges which are adapted to be disposed in closely adjacent relationship to the respective longitudinal edges of a next adjacent heat-transfer controlling panel when said heating panels are angularly positioned about their pivot axes to place said heat-transfer controlling panels in a same plane thereby forming a substantially continuous wall-surface, each of said heating panels having its pivot axis disposed parallel to its longitudinal dimension and lying in the plane of said heat-transfer controlling panel.

4. A heating unit according to claim 1 wherein said supporting structure includes inlet and outlet means communicating with the vertically extending chamber at the bottom and top thereof, respectively, and with a space in a building having a building wall in which the heating unit is positioned and which space is to be heated by said heating unit so as to permit a flow of air in association with said cellular units to effect heating thereof.

5. A heating unit according to claim 4 in which an air circulation inducing fan is disposed in the air flow path.

6. A heating unit according to claim 4 or 5 which includes a second outlet formed at the top of the closed space and communicating with the exterior of the building space, and directional flow control means disposed in the air flow path and selectively operable to direct air flow through a selected one of said outlets.

7. A heating unit according to claim 6 wherein said solar energy heating panels are selectively rotatable about their axes to either have the cellular units facing toward said radiation transmitting panel or to have the cellular units facing toward the rear panel, the heat-transfer controlling panels forming a substantially continuous wall surface in the latter position that is reflective of solar radiation.

8. A heating unit according to claim 1 wherein one surface of each of said longitudinal walls of said cellular unit is reflective of solar radiation.

9. A heating unit according to claim 8 wherein said surfaces of each of said longitudinal walls reflective of solar radiation are coated with a material that enhances their solar radiation reflectivity.

10. A heating unit according to claim 9 wherein each of the other surfaces of said transverse and longitudinal walls forming interior walls of cells of said cellular unit are coated with a material which enhances solar radiation absorption.

11. A heating unit according to claim 1 wherein said longitudinal and transverse walls of said cellular unit are formed from a material having a relatively high coefficient of thermal conductivity.

12. A heating unit according to claim 1 or 8 wherein said first surface of said controlling panel is absorptive of solar radiation.

13. A heating unit according to claim 12 wherein said controlling panel is provided at the first surface thereof with a solar radiation absorptive sheathing which forms a bottom wall of each cell of said cellular unit.

14. A heating unit according to claim 13 wherein said sheathing is formed from a material having a relatively high coefficient of thermal conductivity.

15. A heating unit according to claim 1 wherein the second surface of said controlling panel is reflective of solar radiation.

16. A heating unit according to claim 15 wherein said controlling panel is provided at the second surface thereof with a solar radiation reflective sheathing.

17. A heating unit according to claim 15 or 16 wherein said controlling panel has the second surface thereof coated with a material that enhances its solar radiation reflectivity.

18. A heating unit according to claim 1 wherein said controlling panel includes a sheet of thermally insulative material interposed between the first and second surfaces thereof, said first surface being absorptive of solar radiation and said second surface being reflective of solar radiation.

* * * * *